Feb. 4, 1969  E. JONES  3,425,444
RELIEF VALVE
Filed Jan. 10, 1966
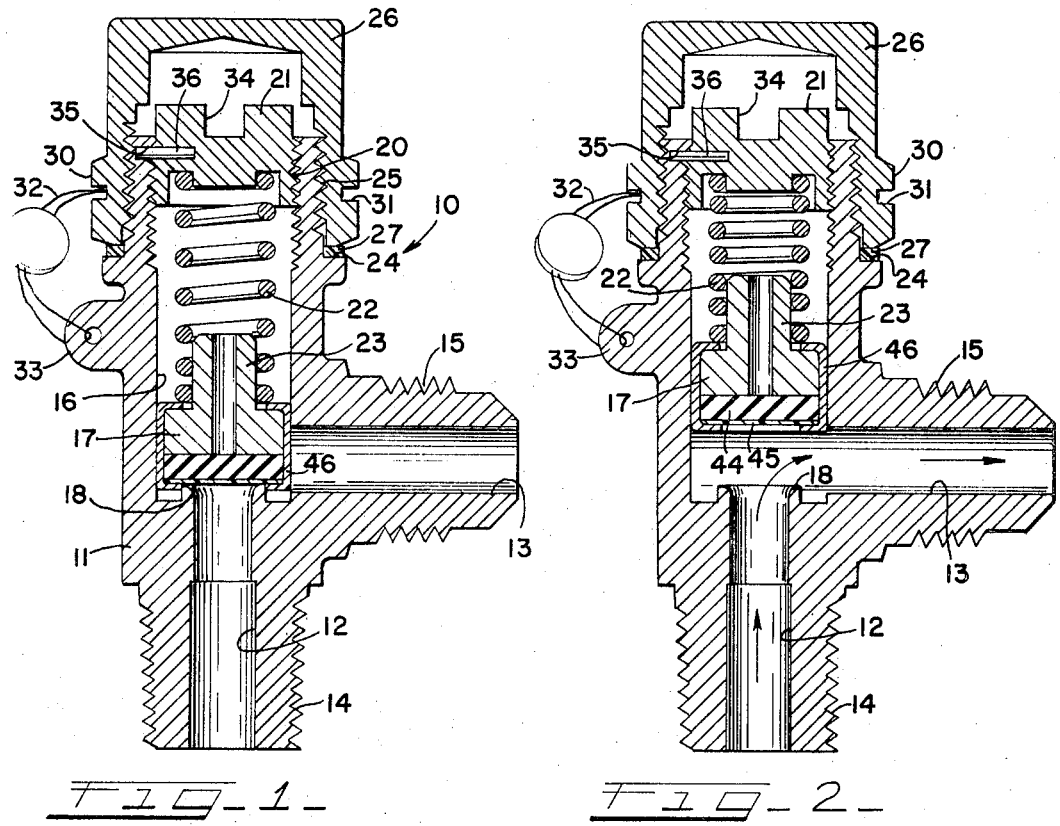
Fig-1-    Fig-2-
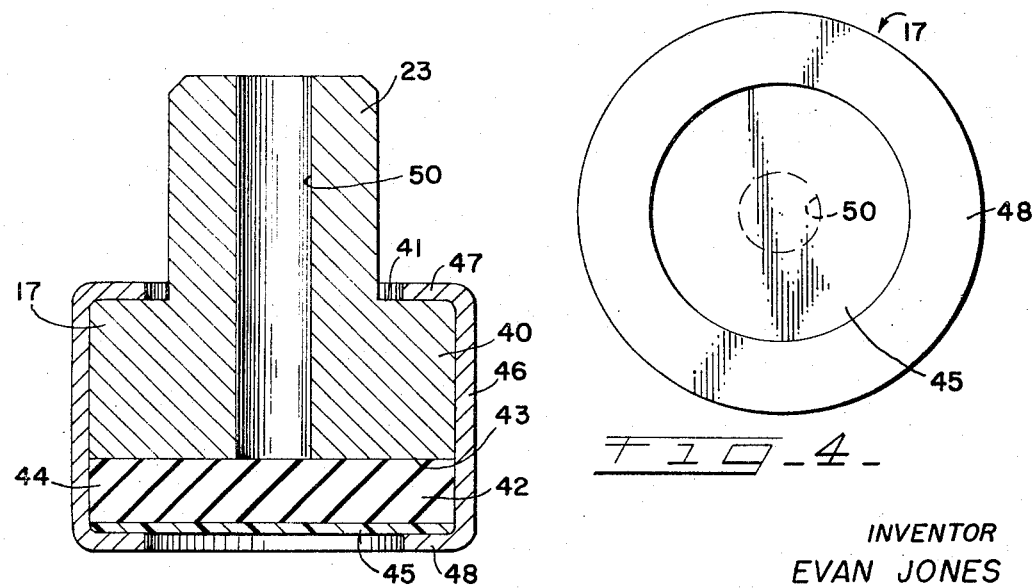
Fig-3-    Fig-4-
INVENTOR
EVAN JONES
BY Greist, Lockwood,
Greenawalt & Dewey ATT'YS.

United States Patent Office 3,425,444
Patented Feb. 4, 1969

3,425,444
RELIEF VALVE
Evan Jones, Evanston, Ill., assignor to Henry Valve Company, Melrose Park, Ill., a corporation of Illinois
Filed Jan. 10, 1966, Ser. No. 519,678
U.S. Cl. 137—540           2 Claims
Int. Cl. F16k 17/06, 25/04, 17/30

ABSTRACT OF THE DISCLOSURE

A relief valve for use in lines containing refrigerants or the like, in which a valve body is provided which includes an inlet and an outlet, and a connecting passageway, a fixed valve seat disposed therein, and a movable valve seat adapted to be moved into co-operating sealing relation therewith. Spring means is provided for moving a piston which contains a valve seat means on the ends thereof axially within a piston chamber, and into a position engaging the valve seat. The movable valve seat is a laminated material which comprises a resilient, rubber backing material, and a very thin film of a synthetic plastic material on one surface thereof. In use, the rubber provides resiliency and enables the seat to obtain a good seal, while the plastic face material is resistant to softening by the product contained in the lines, and does not become tacky or adherent to the valve seat in use.

---

This invention relates to improvements in relief valves and more specifically is directed to a relief valve having a novel valve seat and piston construction on which the valve seat is mounted.

A considerable amount of attention has been given in the trade in recent years towards the development of a relief valve which would provide satisfactory functional results while at the same time be sufficiently practical from the standpoint of production, operation and maintenance to be commercially feasible. In response to this attention, a large number of designs for relief valves have been proposed which represent considerable progress, however, there remains ample opportunity for improvement in certain specific areas.

A number of structural prerequisites must be embodied in a relief valve of the type described if the desired ends with regard to function and cost are to be met. Since relief valves by their very definition only operate to relieve pressures, their application is normally one in which actual operation must be completely predictable for each instance of relieving regardless of the frequency. Obviously, structural simplicity is of paramount importance in any design, for it is well known that over-sophistication oftentimes breeds unreliability and reliability is an indispensible attribute of any satisfactory relief valve. Also, simplicity and cost are so related that the former takes on added importance in any relief valve design.

One particular specific problem which has been of some concern in the relief valve art is that of sticking which, of course, makes valve operation unpredictable since an increase in pressure is necessary to overcome the added resistance to valve movement during the relief cycle. To a large degree, the adherence of the movable valve seat to the fixed valve seat has been one of the major causes of this problem. In attempts to obviate the problems, different types of elastomeric seats have been proposed and used with a certain degree of success, however, certain other problems have arisen as a result of their use. Most elastomers have a certain degree of permeability which permits seepage of the fluid sealed against in very small amounts, but in sufficient quantity to sometimes cause the elastomeric seat to become distorted or dislodged from the movable valve member. In either case, valve operation is affected. Also, elastomeric materials are not completely satisfactory in all applications because certain fluids such as refrigerants and the like have a tendency to cause deterioration of the valve seat with the consequent failure of the relief valve.

The present invention proposed a unique and practical solution to the problem within the framework of the considerations discussed immediately above. In the present construction, a relief valve is provided with a piston slidably positioned within the valve body and mounting a novel movable valve seat. This seat co-operates with a fixed metal seat which is formed in the body of the valve. The piston is provided with a seat retainer which holds a novel elastomeric seat member having a thin lamina of impervious plastomeric material such as fluorocarbon disposed over the seating surface and engageable with the valve seat. In this manner the good seating and biasing qualities of the elastomeric member may be retained without the adverse effects noted in the prior art. Suitable means is provided in the body of the piston to relieve any pressure build up which could possibly form behind the valve seat of elastomeric and impervious plastomeric material to provide an additional safeguard against distortion.

It is a general object of this invention to provide a relief valve which is simple both in structure and operation and which is characterized by a novelly constructed and mounted seating member.

It is a further object of this invention to provide a relief valve which will be predictable in operation over a prolonged period of time regardless of the frequency of operational cycles.

It is a more specific object of the invention to provide a new and improved relief valve which may be economically produced without a sacrifice in quality.

Other and further objects of the invention will become apparent from the detailed description to follow.

In the drawings:

FIG. 1 is a longitudinal cross section taken through the valve of the present invention when in the closed position;

FIG. 2 is a cross sectional view similar to FIG. 1 in which the valve is in the open or relieving position;

FIG. 3 is an enlarged cross sectional view of the movable piston construction forming the movable seat; and FIG. 4 is an enlarged bottom plan view of the piston of FIG. 3.

Referring now to FIG. 1, reference character 10 indicates a relief valve constructed in accordance with the principles of the present invention. The relief valve 10 includes a valve body 11 of generally T-shaped configuration which is formed with an inlet passageway 12 and outlet passageway 13 each of which is provided with external threads 14 and 15 or the equivalent respectively for connection into the system.

A co-axial fixed seat 18 is formed at the junction of the inlet passageway 12 with a piston chamber 16, the latter being in communication with the outlet 13 during the relieving cycle. The piston chamber 16 slidably mounts a piston member 17 which co-operates with the fixed seat 18. The outer end of the piston chamber 16 is provided with internal threads 20 which mount an adjusting gland 21 forming an abutment for one end of a coil spring 22. The opposite end of the coil spring 22 engages the piston member 17, being positioned around a cylindrical section 23 of reduced diameter which provides a guide for the spring member 22.

A shoulder 24 is formed outwardly of the internal threads 20 with concentric external threads 25 provided intermediate the shoulder 24 and the upper end of the valve body. The threads 25 receive a threaded cap 26 which has the lower end portion thereof engaged with a gasket 27 resting on the shoulder 24. In this manner, the relieve valve is sealed against the ingress of dirt and other foreign matter, entry of which could seriously effect its functioning.

Tool pads 30 may be provided on the cap 26 to facilitate tightening and are interrupted by an annular groove 31 which receives a sealing wire 32 looped through an ear or eye member 33 formed on the valve body 11. It is contemplated that the amount of compression of the spring may be set by rotating the adjusting gland 21 through use of a suitable tool such as a standard screwdriver inserted in the cross slot 34. Adjustment of compression of the spring 22 sets the valve for the proper relieving pressure. When adjustment is complete, a hole may be bored, as shown at 35, through the wall of the valve body 11 into the adjusting gland 21, and a pin 36 inserted to prevent relative rotation between the adjusting gland 21 and the valve body 11. Installation of the cap 26 and the sealing wire 32 discourages tampering as well as making it obvious when such has occurred so that corrective measures may be taken.

Referring now to FIGS. 1, 3 and 4, a detailed description of the piston 17 will be given. The piston 17 is of annular form having an enlarged head 40 which is joined by an inwardly projecting radial shoulder 41 to the cylindrical section 23. A valve seat member 42 overlies the end surface 43 of the piston head 40 and consists of an elastomeric backing 44 covered with a thin impervious plastomeric layer 45. The valve seat member 42 is in the form of an annular disc which is clamped to the end face 43 of the piston 17 by means of a seat retainer 46 having inwardly projecting annular flanges 47 and 48 curled over the shoulder 41 and seat member 42, respectively.

A relief opening or bore 50 extends longitudinally through the piston member from the end of the cylindrical section to the end face 43 to permit escape of pressure from behind the disc 42 should any seepage occur around the outer margins. The use of the imprevious plastomeric lamina 45 provides added resistance to the corrosive effects of fluids as well as positive impermeability against seepage.

The plastomeric lamina 45 on the valve seat member or disc 42 is formed to a thickness which is carefully controlled in order to enable the elastomeric portion 44 to exert the desired degree of resilience to seat the impervious lamina 45 against the fixed seat 18 and thereby compensate for any scratches or imperfections in the seat. It has been found that the lamina may not exceed a thickness of more than about 0.005 inch thick or good seating against the fixed seat can not be obtained. Lesser thicknesses have been used with good success so long as they are sufficient to provide the requisite impermeability. The material chosen for the lamina may be one of the fluorocarbon group and in particular polytetrafluoroethylene, known commercially as Teflon. The inert characteristics of the fluorocarbons resist the corrosive effects of fluid such as refrigerants and the like and also has sufficient inherent lubricity to avoid sticking to the fixed valve seat even though valve operation is infrequent.

Referring now to FIG. 2, the relief valve is shown with parts in the typical condition assumed under operation. When the pressure in the inlet line exceeds the pre-set valve, the force developed by the fluid acting against the end of the piston 17 causes the movable valve seat 45 to move away from the fixed valve seat 18 compressing the spring 22. As the piston moves away, the area exposed to fluid pressure is increased developing additional force to hold the valve in the open condition while the fluid is vented out in the direction of the arrows through the outlet 13 which as previously described may be joined to an exhaust line, sump tank or the like.

It is to be appreciated that any fluid which may seep around the valve seat member 42 during the relieving operation of the valve will not be subsequently entrapped when the valve closes, but may be vented directly thorugh the bore 50. When the pressure is relieved, the piston 17 returns to the position shown in FIG. 1, causing the thin lamina 45 to engage the fixed seat 18, with resilient backing for good seating provided by the elastomeric backing 44.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A relief valve particularly adapted for use in fluid lines containing refrigerants and the like, said relief valve comprising a valve body having an inlet and outlet, a passageway extending between said inlet and outlet, a fixed valve seat formed in said valve body and surrounding said passageway, a piston chamber formed in said valve body and forming a part of said passageway, a piston slidably received in said piston chamber, a movable valve seat fixed to one end of said piston and movable therewith into co-operating engagement with said fixed valve seat to control flow of fluid through said valve, said movable valve seat being formed from a layer of plastomeric material of a thickness not greater than 0.005 inch, which is impervious to fluid but sufficiently flexible to provide good valve seating when engaged with said fixed valve seat.

2. In a relief valve having a valve body, a fluid passageway extending through said body, said passageway forming a piston chamber in which is positioned a slidable piston having a valve seat mounted on one end thereof for co-operation with a fixed valve seat formed in said passageway in said valve body, the improvement which comprises one of said valve seats comprising an elastomeric disc having a layer of not more than 0.005 inch in thickness of a polytetrafluoroethylene material secured thereto, said polytetrafluoroethylene material engaging the other of said seats and being resiliently biased into fluid tight seating engagement by said elastomeric material.

References Cited

UNITED STATES PATENTS

| 2,654,559 | 10/1953 | Franck | 251—331 |
| 3,035,809 | 5/1962 | Dickinson | 251—368 XR |
| 3,130,954 | 4/1964 | McFarland | 251—331 |
| 3,169,548 | 2/1965 | McIntosh | 251—368 XR |
| 3,189,040 | 6/1965 | Johnson | 137—469 |
| 3,241,806 | 3/1966 | Snell | 251—368 XR |

FOREIGN PATENTS

| 121,570 | 12/1918 | Great Britain. |
| 706,112 | 3/1954 | Great Britain. |

HAROLD W. WEAKLEY, *Primary Examiner.*

U.S. Cl. X.R.

137—469, 514.5; 251—368

UNITED STATES PATENT OFFICE

CERTIFICATE OF CORRECTION

Patent No. 3,425,444  February 4, 1969

Evan Jones

It is certified that error appears in the above identified patent and that said Letters Patent are hereby corrected as shown below:

Column 1, line 66, "problems" should read -- problem --. Column 3, line 63, before "parts" insert -- the --. Column 4, line 9, "thorugh" should read -- through --; line 34, after "of" insert -- elastomeric material supporting a layer of --.

Signed and sealed this 31st day of March 1970.

(SEAL)
Attest:

Edward M. Fletcher, Jr.  WILLIAM E. SCHUYLER, JR.
Attesting Officer  Commissioner of Patents